United States Patent [19]

Sullins et al.

[11] 4,393,087

[45] Jul. 12, 1983

[54] PROCESS FOR THE PRODUCTION OF A FLOATING AQUATIC FOOD PELLET

[75] Inventors: Richard D. Sullins, Manchester, Mo.; Kent J. Lanter, Millstadt, Ill.

[73] Assignee: Ralston Purina Company, St. Louis, Mo.

[21] Appl. No.: 259,882

[22] Filed: May 4, 1981

[51] Int. Cl.³ .............................................. A23K 1/175
[52] U.S. Cl. ...................................... 426/74; 426/623; 426/658; 426/807
[58] Field of Search ................. 426/1, 74, 93, 99, 560, 426/615, 623, 658, 454, 805

[56] References Cited

U.S. PATENT DOCUMENTS 2,358,320 9/1944 Eisaman .............................. 426/805
4,171,385 10/1979 Skoch et al. ......................... 426/807

Primary Examiner—Raymond N. Jones
Assistant Examiner—Elizabeth A. Hatcher
Attorney, Agent, or Firm—Virgil B. Hill

[57] ABSTRACT

A process for the production of a floating aquatic food pellet is disclosed which avoids the use of extrusion-expansion equipment to provide floatability. Conventional pelleting equipment may be used to produce a pellet from farinaceous-proteinaceous mixtures, which contains sufficient expanded grain particles to provide buoyancy or floatability. A hardenable or vitrifiable matrix containing a liquid carbohydrate material, a water soluble phosphorous source, a colloid material and an alkaline earth oxide is included to prevent compaction of the expanded grain particles during pelleting and provide structural integrity and floatability to permit feeding by an aquatic species.

29 Claims, No Drawings

PROCESS FOR THE PRODUCTION OF A FLOATING AQUATIC FOOD PELLET

BACKGROUND OF THE INVENTION

The present invention relates to a floating aquatic food pellet and method of forming the same.

Aquatic food pellets conventionally sold for the raising of fish or other aquatic species have been generally of two types. The pellets have either been of sufficient density to allow them to sink in the water as would be necessary for the feeding of crustaceans or bottom feeding fish, or they have been of a reduced density to allow them to float on the surface of the water.

The floating type of pellet has typically been produced by an extrusion-expansion process rather than a conventional pelleting process because of the ability of an extruder to provide a significant decrease in bulk density of certain farinaceous-proteinaceous mixtures caused by gelatinization of the starch from the moisture, temperature and pressure conditions existing in the extruder. Conventional pellet mills, however, will normally not reduce the bulk density of these mixtures. Therefore, all floating aquatic food pellets of this type have heretofore been made on an extruder.

While those extruded products are highly satisfactory, it requires a substantial capital investment by a feed mill that is typically equipped only for the pelleting of feeds but not for extrusion. It would, therefore, be advantageous if a floating aquatic food pellet could be produced on a conventional pellet mill.

The expansion of certain grains such as by "popping" or "puffing" of the intact grain particle under heat and/or pressure is well known. Expansion of the particle by popping or puffing results from the increased vapor pressure in the intact grain particle because of vaporization of the existing moisture in the interior of the grain particle which is restricted by the pericarp of the grain particle. Eversion or popping in effect causes a "turning inside out" of the endosperm by rapid expansion of the starch material in the grain. This in effect causes a reduction in bulk density.

The use of expanded grain particles such as puffed or popped grains in producing floating aquatic food pellets provides a means of reducing the density of these materials to permit floating in aqueous mediums. It has, however, been determined that the expanded grains are unsuitable for a conventional pelleting process. Why this is the case is not completely understood, however, it is believed that an increase in pressure results in the pellet mill, when materials containing the expanded grains are pelleted, which causes a compression of the materials with an increase rather than a decrease in density. Also even if the density did not increase, the pellets still had poor structural integrity in water.

SUMMARY OF THE INVENTION

This difficulty in the pelleting of expanded grains in order to produce a floating aquatic food pellet, is overcome by incorporating a hardenable or vitrifiable matrix in the mixture containing the expanded grain particles prior to pelleting. During the pelleting process, with the application of heat and pressure, the matrix hardens or vitrifies and not only produces a pellet of satisfactory hardness and quality, but also has good structural integrity in water. Furthermore, the pellet with the hardenable or vitrifiable matrix has excellent floatability because it is believed that the hardenable matrix assists in lubrication of the die to prevent compaction of the pellet and thereby produce a pellet containing the expanded grain particles that will readily float.

A preferred matrix for use in the present process is a hardenable matrix comprising a liquid carbohydrate medium, water, a water soluble phosphorous source, a colloidal material and an alkaline earth oxide. This matrix will solidify or harden upon the application of heat during pelleting to improve the structural integrity of the pellet in water. Furthermore, the matrix is believed to prevent compaction of the pellet with the expanded grain particles by sufficiently lubricating the die to prevent this problem. The pellet with the expanded grain particles therefore retains its floatability which is directly due to the presence of the expanded grain particles.

It is, therefore, an object of the present invention to produce a floating aquatic food pellet.

It is a further object of the present invention to produce a floating aquatic food pellet containing expanded grain particles such as everted or puffed grains for buoyancy of the pellet.

It is a further object to produce a floating aquatic food pellet having sufficient structural integrity in the water to permit feeding by an aquatic species.

It is a further object to produce a floating aquatic food pellet having sufficient floatability in water to permit feeding by an aquatic species.

These and other objects are readily achieved by the present invention as hereinafter described.

DESCRIPTION OF THE PREFERRED EMBODIMENTS

The food product of the present invention is made by first formulating appropriate proteinaceous and farinaceous materials to provide a diet which is nutritionally suitable to various aquatic species such as crustaceans or fishes of various types. It is readily apparent that various proteinaceous and farinaceous ingredients may be employed in the food product of the present invention for nutritional purposes and the exact formulations desired will be readily apparent to one skilled in the art depending on availability of ingredients or the specific aquatic species being fed. It would be further apparent to one skilled in the art to add or substitute other ingredients or change the ingredient ratios depending on the particular nutritional balance desired and the following list of ingredients is intended to represent only a typical nonlimiting listing of various materials that can be added or selected for formulating the food product of the present invention.

| Ingredient | Percent by Weight |
| --- | --- |
| Ground Yellow Corn | 0–45% |
| Ground Wheat | 5–30% |
| Ground Milo | 0–15% |
| Brewers Yeast | 0–2% |
| Dried Whey | 0–4% |
| Condensed Fish Solubles | 5–12% |
| Defatted Soy Meal or Flour | 10–60% |
| Fish Meal | 15–60% |
| Blood Meal | 0–10% |
| Liver Meal | 0–10% |
| Dehydrated Alfalfa | 0–5% |
| Distillers Grain | 0–10% |
| Dicalcium Phosphate | 0–10% |
| Vitamin Mixture | 1–5% |

| -continued |  |
|---|---|
| Ingredient | Percent by Weight |
| Mineral Mixture | .5–3% |

It is also desirable to include in the nutritionally balanced mixture various additives which serve as attractants for the aquatic species and make the product of the present invention more appealing in palatability to the particular species involved and among such materials which are suitable include fish solubles, condensed fish solubles, various aliphatic amines and the like.

The farinaceous-proteinaceous materials as selected for nutritional balance are then combined with an amount by weight of the pellet of expanded grain particles effective to provide buoyancy and floatability for the pellet. As previously noted, the ability of certain grains such as corn, milo and the like to "pop" or evert under the application of heat or pressure is well known. Popping results from the increased vapor pressure in the intact grain because of vaporization of the existing moisture in the interior of the particle. This buildup in pressure is restricted by the pericarp of the grain which confines it until it becomes sufficiently high that it ruptures the pericarp thereby causing a "turning inside out" or eversion of the endosperm to result in a popped product of reduced density. These expanded grain particles such as popped corn or milo provide the buoyancy for the floating aquatic food pellet of the present invention and are incorporated into the proteinaceous-farinaceous mixture in an amount necessary to provide floatability or buoyancy of the pellet. Likewise, those expanded grain particles which are "puffed" by a puffing gun or similar means are also suitable to provide buoyancy for the pellet. The amount of expanded grain particles that can typically be employed in producing a satisfactory aquatic food pellet according to the present invention is typically between about 25 and 50% by weight of the pellet with a preferred range of 35 to 50% by weight. These levels provide a pellet that has sufficient floatability or buoyancy to remain floating in the water for a period of time sufficient to permit feeding by an aquatic species.

Methods that may be used for expanding the grains suitable for use in the present invention are well known in the art and include a variety of devices which are commercially available for the roasting, popping or puffing of grains in general. While a variety of grains are suitable for popping, it is apparent that some grains pop better than others and those materials which are particularly preferred include corn and milo, which have the ability to produce a high percentage of popped grain particles when the intact particles are subjected to the application of heat. Other grains may be used such as wheat, millet or barley, although because of the lower percentage of particles that will pop, they are not preferred from an economic standpoint.

The expanded grain particles, either popped or puffed, in an amount to provide buoyancy or floatability of the pellet, are dry-blended with the proteinaceous-farinaceous mixture to provide a mixture that is generally nutritionally complete as an aquatic food pellet. This mixture is then blended with a percentage of fat, preferably 7 to 13% by weight and most preferably 9 to 10% by weight of the pellet. This level of fat is important to the characteristics of the aquatic food pellet of the present invention since in cooperation with the hardenable matrix included in the process of the present invention it provides the product with a good structural integrity yet sufficient floatability in water to permit feeding by an aquatic species. While the particular type of fat that is employed in the present invention is not at all critical various types of fat or oils, as are commercially available and typically employed in aquatic rations can be used and among those include animal or vegetable fats such as tallow, corn oil, fish oil and the like.

As previously noted, in initial attempts to pellet the food products of the present invention containing expanded grains, it was determined that in fact a compaction of the pellet occurred and although the reason for this phenomenon is not entirely understood, it is believed to be due to an increase in pressure in the pelleting die. Why this increase in pressure occurs is not known, but it is clear that the presence of the expanded grains without the presence of the matrix in fact, during pelleting cause a compaction of the pellet and therefore, an increase in bulk density rather than the desired decrease in bulk density to provide a pellet that is floatable. This unexpected phenomenon has been overcome by the use of a hardenable or vitrifiable matrix incorporated in the mixture prior to pelleting as hereinafter described.

The hardenable or vitrifiable matrix comprises generally a liquid carbohydrate medium, water, a water soluble phosphorous source, a colloidal material, and an alkaline earth oxide. This mixture will readily solidify or harden during the application of heat as occurs during the pelleting process to prevent the compaction of the expanded grain particles during the pelleting process. Additionally, the presence of the vitrifiable or hardenable matrix assists in improving the structural integrity of the pellet to thereby provide sufficient integrity and floatability in water for a period of time sufficient to permit feeding by an aquatic species.

The hardenable or vitrifiable matrix is included in the pellet in an amount of between 5 and 15% by weight of the pellet and preferably 10 to 13% by weight of the pellet. It has been determined that this is the desired amount for maximum floatibility and structural integrity of aquatic food pellet containing expanded grain such as popped or puffed grain. The hardenable or vitrifiable matrix is separately prepared as hereinafter described. 40 to 75% of the matrix of a liquid carbohydrate medium such as molasses, 5 to 15% of water and 0.1 to 8% of a water soluble phosphorous source are separately mixed for one (1) minute followed by the addition of 0.5 to 4% of a colloidal material such as attapulgite clay or 0.05 to 2% of a colloidal material such as a vegetable gum with additional mixing for two (2) minutes. This is followed by the addition of a fat in an amount of 1 to 20% by weight with additional mixing for one (1) minute. The addition of the colloidal material is followed by the addition of an alkaline earth oxide such as magnesium oxide in an amount of 3 to 10% by weight or an amount effective to obtain a vitrifiable matrix which solidifies to form a hardenable matrix upon the application of heat during pelleting. The method and formulation for forming the vitrifiable matrix of the present invention is fully described in U.S. Pat. Nos. 4,171,385 and 4,171,386 and U.S. patent application Ser. No. 005,887, all filed Jan. 23, 1979, herein incorporated by reference. The hardenable matrix is included in the farinaceous-proteinaceous mixture containing the expanded grain particles and is pelleted as conventionally carried out in a feed mill by using a conventional pellet die to provide an aquatic food pellet which has excellent floatability in water. The expanded grain particles provide buoyancy to the pellet and the hardenable matrix provides structural integrity in addition to improving the pelleting process to prevent compaction of the expanded grains during pelleting. This provides an effective and efficient means of producing floating aquatic food pellets by the use of conventional pelleting equipment. This is believed to represent a significant departure in the art of feed processing and permits a small feed mill to produce floating food pellets without investment or purchase of new and unnecessary amounts of extrusion equipment.

The following Examples will set forth fully specific but non-limiting embodiments of the present invention.

EXAMPLE 1

A floating aquatic food pellet was prepared according to the following procedure. A fish food was formulated with the following ingredients.

| Ingredients | % by Weight |
|---|---|
| Soybean Meal (49% protein) | 22.0% |
| Fish Meal | 5.5% |
| Bleachable Fancy Tallow | 10.0% |
| Popped Corn (ground) | 50.0% |

A hardenable matrix was separately prepared by initially forming the following mixture:

| Ingredients | % by Weight |
|---|---|
| Cane Molasses | 65% |
| Water | 15% |
| Ammonium Polyphosphate | 5.5% |

This was mixed for a period of 15 seconds followed by the addition of 1.5% by weight attapulgite clay with mixing for an additional 2 minutes. 5% by weight bleachable fancy tallow was added and mixed for an additional 15 seconds. 2% by weight ferrous sulfate was added and mixed for 30 seconds. This was followed by the addition of 6% by weight of magnesium oxide with mixing for an additional 3 minutes.

12.5% by weight of the feed of the hardenable matrix and the dry ingredients were blended in a mixer and then pelleted on a conventional pelleting mill with a ¼" by 2" die.

The pellets obtained by the above process floated well when placed in water and retained their ability to float for 10 minutes without significant disintegration.

EXAMPLE 2

A fish food having the identical formulation of Example 1 was prepared with the exception that no bleachable fancy tallow was added, and 8% soybean meal and 2% fish meal was added to the dry ingredients as a substitute for the fat. A hardenable matrix was prepared as described in Example 1 and added to the feed ingredients in an amount of 12.5% by weight of the feed. The product was pelleted as described in Example 1 and while the pellets were of good quality, they did not float as well as those in Example 1, but instead floated only for about a period of one minute.

EXAMPLE 3

To illustrate the importance of the level of hardenable or vitrifiable matrix and fat relative to the floatability and integrity of the product of the present invention in water, the following products were prepared.

The formula set forth in Example 1 was followed including a level of 50% popped corn, however, the level of hardenable matrix and fat were varied according to the following Table. In two of the samples B and C, molasses was substituted for the hardenable matrix.

TABLE I

| Sample | A | B | C | D | E | F | G | H | I | J |
|---|---|---|---|---|---|---|---|---|---|---|
| % Fat | 10 | 10 | 10 | 13 | 13 | 13 | 10 | 10 | 10 | 10 |
| % Hardenable Matrix | 12.5 | — | — | 15 | 12.5 | 9 | 15 | 12.5 | 9 | — |
| % Molasses | — | 12.5 | 12.5 | — | — | — | — | — | — | — |

| Sample | K | L | M | N | O | P | Q | R | S | T |
|---|---|---|---|---|---|---|---|---|---|---|
| % Fat | 7 | 7 | 7 | 4 | 4 | 4 | 4 | — | — | — |
| % Hardenable Matrix | 15 | 12.5 | 9 | 15 | 12.5 | 9 | 5 | 12.5 | 9 | 5 |
| % Molasses | — | — | — | — | — | — | — | — | — | — |

The hardenable matrix was also generally prepared as described in Example 1, and a combination of 80% soybean meal and 20% fish meal was added to any of the above samples in order to bring the ingredient total to 100% by weight.

Pelleting was carried out as described in Example 1 and following pelleting, cooling and storage at ambient conditions for 24 hours, samples of each of the above formulas were evaluated for the following characteristics according to the procedure set forth.

% Fines—Percentage Fines (% by weight) from a 50 lb bag by using a #3½ Tyler Screen. (Percentage that would pass screen).

Pellet Durability
  % retained on a #3½ Tyler screen after carrying out Kansas State Pellet Durability Test described in *Feed Manufacturing Technology*, Page 527 (1976) published by the American Feed Manufacturers Association.

Floatability
  % of 10 pellets floating in still water after 10 minutes.

Pellet Condition
  Subjective evaluation of pellet condition in floatability test after 10 minutes.

TABLE II

| Sample | A | B | C | D | E | F | G | H | I | J |
|---|---|---|---|---|---|---|---|---|---|---|
| % Fines | 14.3 | 22.5 | — | 15.0 | 12.8 | 26.1 | 14.1 | 25 | 26 | 56 |
| Pellet Durability | 82.0 | 78.6 | — | 85.8 | 85.8 | 77.6 | 87.6 | 83 | 80 | 51 |
| Floatability (%) | 100 | 20 | 20 | 100 | 100 | 100 | 100 | 100 | 85 | 40 |
| Pellet Condition | OK | OK | GOOD | OK | GOOD | GOOD | OK | GOOD | POOR | POOR |

| Sample | K | L | M | N | O | P | Q | R | S | T |
|---|---|---|---|---|---|---|---|---|---|---|
| % Fines | 25 | 24 | 21 | 11 | 12.9 | 17.2 | — | 12.9 | 11.0 | 11.3 |
| Pellet Durability | 86 | 80 | 76 | 88 | 87.6 | 84 | — | 88.4 | 89.6 | 91.4 |
| Floatability (%) | 100 | 95 | 90 | 50 | 0 | 0 | 0 | 0 | 0 | 0 |

TABLE II-continued

| Pellet Condition | OK | POOR | POOR | — | — | — | — | — | — |

It may be seen from the above data that the floatability of the pellets was best when the levels of hardenable matrix and fat was above 5 and 7% respectively. The optimum results insofar as floatability were obtained when the level of hardenable matrix was 10–15% and the level of fat was 10–13%. It should be recognized, however, that the pellets do not have to float to the extent of 100% when added to water for 10 minutes or for even 10 minutes duration to be within the scope of the present invention. Pellets with a lesser degree of floatability are also suitable and therefore, the fact that some levels of fat and matrix produced a lower degree of floatability does not indicate they are inoperative for purposes of the present invention, since the degree of floatability is a matter of preference for the user. The above figures, therefore, represent only an illustrative and not a limiting representation of the effect of various ingredients on floatability of products made according to the present invention, and are submitted for purposes of comparison rather than as limits of the present invention.

With reference to the data concerning durability and fines, the higher the number from the durability test, the more durable the pellet, and the lower the number for the % of fines the more durable the pellet. It may be seen that when lower levels of hardenable matrix and fat were used pellet durability increased but floatability did not.

Having described the present invention with reference to the specific embodiments set forth above, it is to be understood that it is intended to include all reasonable modifications or substitutions within the scope of the present invention.

What is claimed is:

1. A process for the production of a floating aquatic food pellet comprising:
   (a) forming a first mixture of proteinaceous and farinaceous materials with fat and sufficient expanded grain particles to provide floatability for said pellets;
   (b) separately forming a hardenable carbohydrate matrix and combining said matrix with said first mixture,
   (c) pelleting the combined matrix and mixture by the application of heat and pressure with the matrix preventing compaction of the expanded grain particles to and form a floating aquatic food pellet with good structural integrity in water.

2. The method of claim 1 wherein said first mixture contains about 25–50% expanded grain particles by weight of said pellet.

3. The method of claim 1 wherein said first mixture contains about 35–50% expanded grain particles by weight of said pellet.

4. The method of claim 1 wherein said fat is present in an amount of about 7–13% by weight of said pellet.

5. The method of claim 4 wherein said fat is present in an amount of about 9–10% by weight of said pellet.

6. The method of claim 1 wherein said hardenable matrix is present in an amount of between about 5–15% by weight of said pellet.

7. The method of claim 6 wherein said hardenable matrix is present in an amount of about 10–13% by weight of said pellet.

8. The method of claim 1 wherein said expanded grain particles are selected from the group consisting of popped and puffed grains.

9. The method of claim 8 wherein said popped grain is selected from the group consisting of corn and milo.

10. The method of claim 1 wherein said hardenable carbohydrate matrix is prepared by mixing a liquid carbohydrate material, water, a water soluble phosphorous source, a colloid material and an alkaline earth oxide.

11. A process for the production of a floating aquatic food pellet comprising;
   (a) forming a first mixture of about 25–50% by weight of said pellet of expanded grain particles, proteinaceous and farinaceous materials, and fat;
   (b) separately forming a hardenable carbohydrate matrix comprising mixing a liquid carbohydrate material, water, a colloid material, a water soluble phosphorous source and an alkaline earth oxide, and combining said matrix with said first mixture,
   (c) pelleting the combined matrix and mixture by the application of heat and pressure with the matrix preventing compaction of the expanded grain particles to and form a floating aquatic food pellet with good structural integrity in water.

12. The method of claim 11 wherein said expanded grain particles are present in an amount of about 35–50% by weight of said pellet.

13. The method of claim 11 wherein said fat in said first mixture is present in an amount of about 7–13% by weight of said pellet.

14. The method of claim 13 wherein said fat is present in an amount of about 9–10% by weight of said pellet.

15. The method of claim 11 wherein said hardenable matrix is present in an amount of about 5–15% by weight of said pellet.

16. The method of claim 15 wherein said hardenable matrix is present in an amount of about 10–13% by weight of said pellet.

17. The method of claim 11 wherein said expanded grain particles are selected from the group consisting of popped and puffed grains.

18. The method of claim 17 wherein said popped grain is selected from the group consisting of corn and milo.

19. The method of claim 11 wherein said liquid carbohydrate medium comprises molasses.

20. The method of claim 11 wherein said colloid material comprises clay.

21. The method of claim 11 wherein said alkaline earth oxide is magnesium oxide.

22. A process for the production of a floating aquatic food pellet comprising;
   (a) forming a first mixture of about 25–50% by weight of said pellet of floatation imparting expanded grain particles, proteinaceous and farinaceous materials, and about 7–13% by weight of said pellet of fat,
   (b) separately forming a hardenable carbohydrate matrix comprising mixing about 40–75% by weight of said matrix of a liquid carbohydrate medium, water, about 0.5 to 4% of said matrix of a colloid material about 0.1 to 8% by weight of said matrix of a water soluble phosphorous source and 3 to 10% of an alkaline earth oxide and combining 5-15% by weight of said pellet of said matrix with said first mixture, (c) pelleting the combined matrix and first mixture by the application of heat and pressure with the matrix preventing compaction of the expanded grain particles to and form a floating aquatic food pellet with good structural integrity in water.

23. The method of claim 22 wherein said first mixture contains about 35-50% expanded grain particles by weight of said pellet.

24. The method of claim 22 wherein said fat is present in an amount of about 9-10% by weight of said pellet.

25. The method of claim 22 wherein said hardenable matrix is present in an amount of about 10-13% by weight of said pellet.

26. The method of claim 22 wherein said expanded grain particles are selected from the group consisting of popped and puffed grains.

27. The method of claim 22 wherein said popped grain is selected from the group consisting of corn and milo.

28. The product produced by the process of claim 1.

29. The product produced by the process of claim 11.

* * * * *